(No Model.)

J. A. TURNER.
DEVICE FOR FASTENING RUBBER TIRES TO WHEELS.

No. 355,359. Patented Jan. 4, 1887.

Witnesses:
H. H. Copeland
A. S. Watson

Inventor:
Joseph A. Turner

UNITED STATES PATENT OFFICE.

JOSEPH A. TURNER, OF PASSAIC, NEW JERSEY.

DEVICE FOR FASTENING RUBBER TIRES TO WHEELS.

SPECIFICATION forming part of Letters Patent No. 355,359, dated January 4, 1887.

Application filed July 22, 1886. Serial No. 208,811. (No model.)

*To all whom it may concern:*

Be it known that I, JOSEPH A. TURNER, of the city and county of Passaic, and State of New Jersey, have invented a new and useful Device for Fastening Rubber Tires to Wheels, of which the following is a specification.

The object of my invention is to attach rubber tires to wheels more securely than by the present methods of gluing and indented tires and grips.

The new feature of my invention is the vulcanization in a soft or flexible rubber tire of pieces of hard rubber containing fastenings, which pass through holes made in the felly of the wheel.

Figure 1:
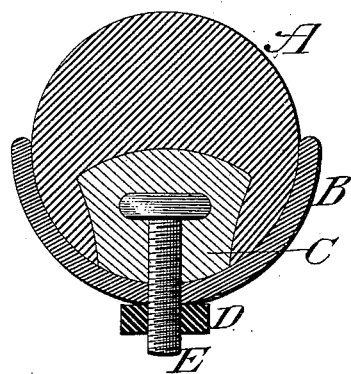
Figure 2:
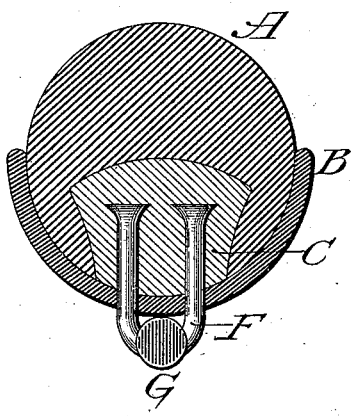
Figure 3:
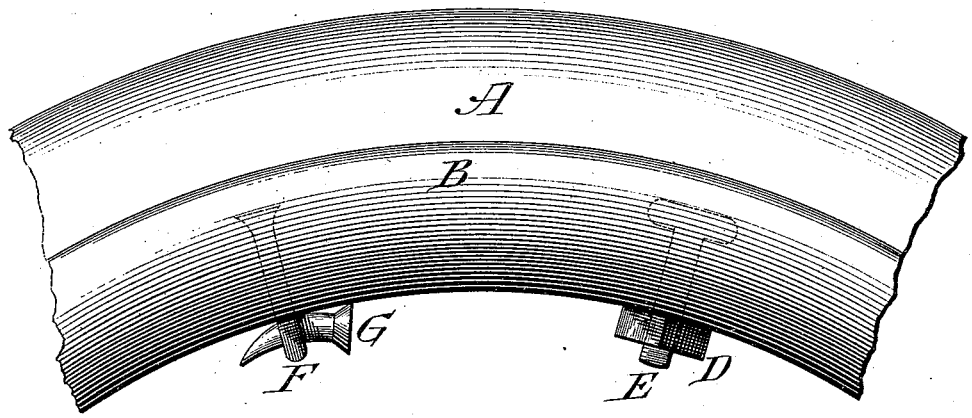

Figures 1 and 2 are sectional views, Fig. 1 showing the method with a bolt and screw, Fig. 2 with staple and pin. Fig. 3 is a lateral view showing the appearance of a tire fastened to a felly by both of these fastenings.

The detail of Fig. 1 is as follows: Make cast of tire in metal or plaster, with bolt or screw to come away with the cast. Around the head of this bolt or screw, while in the cast, pack enough rubber or gutta-percha to hold the bolt or screw in place when vulcanized hard, and enough soft or flexible rubber to complete the tire. Then vulcanize the whole together. The tire when so made leaves the end of the bolt or screw projecting, which is then put through a hole made for that purpose in the felly of the wheel, and is held or fastened by screwing the nut on the projecting end of the bolt or screw.

The same method is followed in Fig. 2, using a staple and pin instead of a bolt and nut.

Almost any kind of fastening may be used, as desired.

In the drawings, A represents the soft-rubber tire; C, the hard rubber, in which is secured the staple F or bolt E, and G and D the fastening devices.

I claim as my invention—

The combination, with a soft or flexible rubber tire, of pieces of hard rubber containing fastenings adapted to pass through holes in the rim or felly of the wheel, said hard-rubber pieces being vulcanized in the soft-rubber tire, substantially as herein described.

JOSEPH A. TURNER.

Witnesses:
 A. L. WATSON,
 H. H. COPELAND.